US010580313B2

(12) United States Patent
Arethens (10) Patent No.: US 10,580,313 B2
(45) Date of Patent: Mar. 3, 2020

(54) ELECTRONIC MONITORING DEVICE FOR MONITORING AT LEAST ONE RADIONAVIGATION SIGNAL DURING AN APPROACH PHASE TO A LANDING RUNWAY, RELATED MONITORING METHOD AND COMPUTER PROGRAM

(71) Applicant: THALES, Courbevoie (FR)

(72) Inventor: Jean-Pierre Arethens, Valence (FR)

(73) Assignee: Thales, Courbevoie (FR)

( * ) Notice: Subject to any disclaimer, the term of this patent is extended or adjusted under 35 U.S.C. 154(b) by 108 days.

(21) Appl. No.: 15/863,739

(22) Filed: Jan. 5, 2018

(65) Prior Publication Data
US 2018/0197422 A1 Jul. 12, 2018

(30) Foreign Application Priority Data
Jan. 6, 2017 (FR) ..................................... 17 00011

(51) Int. Cl.
*G08G 5/02* (2006.01)
*G01S 1/16* (2006.01)
(Continued)

(52) U.S. Cl.
CPC .............. *G08G 5/025* (2013.01); *G01S 1/026* (2013.01); *G01S 1/16* (2013.01); *G01S 19/15* (2013.01);
(Continued)

(58) Field of Classification Search
USPC .......................................................... 701/4
See application file for complete search history.

(56) References Cited

U.S. PATENT DOCUMENTS 3,680,120 A * 7/1972 Benjamin ................. G01S 1/02
342/411
8,630,756 B2 1/2014 Fleiger-Holmes et al.
(Continued)

FOREIGN PATENT DOCUMENTS

EP  1 589 351 A1  10/2005
EP  2 648 017 B1  9/2014
(Continued)

OTHER PUBLICATIONS

Search Report dated Oct. 18, 2017, in French Patent Application No. 17 00011 which is the priority application for the subject application.

*Primary Examiner* — Tyler D Paige
(74) *Attorney, Agent, or Firm* — Knobbe, Martens, Olson & Bear, LLP (57) ABSTRACT

An electronic monitoring device for monitoring at least one radionavigation signal during an approach phase to a landing runway, related monitoring method and computer program are disclosed. In one aspect, the each radionavigation signal is obtained from a reception chain on board an aircraft. The device includes a calculation module configured to calculate an angular displacement value in a reference plane, a comparison module configured to compare the angular displacement value with the corresponding radionavigation signal, and a warning module to generate a warning signal based on the comparison between the angular displacement value and the corresponding radionavigation signal. The calculation module is configured to calculate the angular displacement value as a function of a magnitude relating to the aircraft course and glide path according to the monitored radionavigation signal, from avionics equipment independent from the reception chain.

10 Claims, 6 Drawing Sheets (51) Int. Cl.
*G01S 19/15* (2010.01)
*G05D 1/10* (2006.01)
*G01S 1/02* (2010.01)
*G08G 5/00* (2006.01)
*G01C 5/00* (2006.01)

(52) U.S. Cl.
CPC ........... *G05D 1/101* (2013.01); *G08G 5/0047* (2013.01); *G01C 5/005* (2013.01)

(56) References Cited

U.S. PATENT DOCUMENTS

| | | |
|---|---|---|
| 9,257,050 B2 | 2/2016 | Fleiger-Holmes et al. |
| 2004/0217898 A1* | 11/2004 | Falcati .................... G01S 1/045 342/33 |
| 2012/0265376 A1* | 10/2012 | Fleiger-Holmes ........ G01S 1/18 701/16 |
| 2015/0081143 A1* | 3/2015 | Snow .................. G08G 5/0021 701/16 |
| 2015/0145712 A1* | 5/2015 | Castellanos ............. G01S 1/042 342/33 |

FOREIGN PATENT DOCUMENTS

| | | |
|---|---|---|
| EP | 2 927 704 A1 | 7/2015 |
| EP | 2 648 102 B1 | 5/2016 |
| WO | WO 02/16870 A2 | 2/2008 |

\* cited by examiner

ELECTRONIC MONITORING DEVICE FOR MONITORING AT LEAST ONE RADIONAVIGATION SIGNAL DURING AN APPROACH PHASE TO A LANDING RUNWAY, RELATED MONITORING METHOD AND COMPUTER PROGRAM

BACKGROUND

Technological Field

The described technology relates to an electronic device for monitoring at least one radionavigation signal when approaching a runway, wherein each radionavigation signal is derived from a reception chain on board an aircraft.

Description of the Related Technology

U.S. Pat. No. 8,630,756 B2 discloses an electronic monitoring device. This ILS signal monitoring device comprises a calculation module configured to calculate an angular displacement value of the aircraft in a reference plane based on position information from a ground beacon capable of transmitting the ILS signal, and position information of the aircraft from a GPS receiver on board the aircraft.

This ILS signal monitoring device further comprises a module for comparing the angular displacement value calculated on the basis of the beacon position, with the corresponding radionavigation signal, and a warning module for generating a warning signal as a function of the result of the comparison.

However, such a monitoring device requires precise knowledge of the position of the ground beacon capable of transmitting the ILS signal by coupling with a navigation information database, as well as a sufficiently precise position of the aircraft provided by the GPS receiver.

SUMMARY OF CERTAIN INVENTIVE ASPECTS

Once aspect relates to a monitoring device comprising a calculation module configured to calculate an angular displacement value in a reference plane; a comparison module configured to compare the calculated angular displacement value with the corresponding radionavigation signal; and a warning module configured to generate a warning signal based on the result of the comparison between the calculated angular displacement value and the corresponding radionavigation signal.

The described technology also relates to a method for monitoring at least one radionavigation signal when approaching the runway.

The described technology also relates to a non-transitory computer-readable medium including a computer program comprising software instructions which, when executed by a computer, implement such a monitoring method.

The described technology relates to the field of monitoring an aircraft during its approach to a runway, in particular the monitoring of radionavigation signals for highly secure automatic piloting, as required for approach and landing operations in reduced visibility conditions, for example in category MB according to Annex 10 of ICAO Volume 1. These autopilot systems also use speed measurement information provided by IRS (Inertial Reference System) equipment.

The radionavigation signals to be monitored include, for example, ILS (Instrument Landing System) signals, MLS (Microwave Landing System) signals, or even GLS (GBAS, i.e. Ground-Based Augmentation System Landing System) signals.

Another aspect of the described technology is to provide an electronic monitoring device that is easier to implement, and uses neither the position of the aircraft provided by the GPS receiver, nor the position of the ground beacon.

For this purpose, the subject-matter of the described technology is to provide an electronic monitoring device of the aforementioned type, wherein the calculation module is configured to calculate the angular displacement value as a function of a magnitude relating to the aircraft course and glide slope based on the monitored radionavigation signal, wherein the magnitude relating to the aircraft is obtained from avionics equipment independently of the reception chain.

According to other advantageous aspects of the described technology, the electronic monitoring device comprises one or more of the following characteristics, taken separately or in any technically feasible combination:

the calculation module is configured to calculate the angular displacement value independently of position information from a ground beacon capable of transmitting the radio navigation signal;

the monitored radionavigation signal is an LOC signal, and the calculation module is then configured to calculate a lateral angular displacement value in a horizontal plane as a function of the course of the aircraft;

the monitored radionavigation signal is a GLIDE signal, and the calculation module is then configured to calculate an angular value of vertical displacement in a vertical plane as a function of the glide slope of the aircraft;

the angular displacement value is expressed in DDM (Difference in Depth of Modulation) and the calculation module is configured to calculate a linear deviation of a magnitude as a function of the monitored radionavigation signal and the magnitude relating to the aircraft course and glide slope, and then to convert the linear deviation in the angular displacement value expressed in DDM;

the calculation module is configured to carry out filtering of successive values of the monitored radionavigation signal, while the magnitude dependent on the monitored radionavigation signal is a mean value resulting from the filtering of the values of the monitored radionavigation signal;

the device further comprises a second comparison module configured to compare the mean value resulting from the filtering of the values of the monitored radionavigation signal, with a magnitude relating to the predicted course and the predicted glide slope with respect to the runway according to the monitored radionavigation signal, wherein the predicted magnitude is obtained from a database on board the aircraft and provides the theoretical values of the monitored quantities; and the calculation module is configured to calculate also the linear deviation as a function of the integration of the predicted speed of the aircraft in the reference plane.

The subject-matter of the described technology is also a method for monitoring at least one radionavigation signal during the approach to a runway, wherein each radionavigation signal is obtained from a reception chain on board an aircraft, and wherein the method is implemented by an electronic monitoring device, and comprises:

the calculation of an angular displacement value in a reference plane, the comparison of the calculated angular displacement value with the corresponding radionavigation signal, and the generation of a warning signal as a function of the result of the comparison between the calculated angular displacement value and the corresponding radionavigation signal, wherein the calculation of the angular displacement value is performed as a function of a magnitude relating to the aircraft course and glide slope according to the monitored radionavigation signal, wherein the magnitude relating to the aircraft is obtained from a magnitude is obtained from avionics equipment in the reception chain.

The described technology also relates to a non-transitory computer-readable medium including a computer program comprising software instructions which, when executed by a computer, implement a method as defined above.

BRIEF DESCRIPTION OF THE DRAWINGS

The features and advantages of the described technology will become more clear upon reading the description which follows, given solely by way of a non-limiting example, and with reference to the appended drawings, wherein.

DETAILED DESCRIPTION OF CERTAIN INVENTIVE EMBODIMENTS

Conventionally, in the present application, the expression "substantially equal to" expresses a relationship of equality of plus or minus 10%, more desirably a relationship of equality of plus or minus 5%.

In the remainder of the description, 1 ft means 1 foot, equal to 0.3048 meters, 1 nm means 1 nautical mile, equal to 1,852 meters, and 1 kt means 1 knot, equal to 1 852 m/h, or 0.514 $ms^{-1}$.

Figure 1:
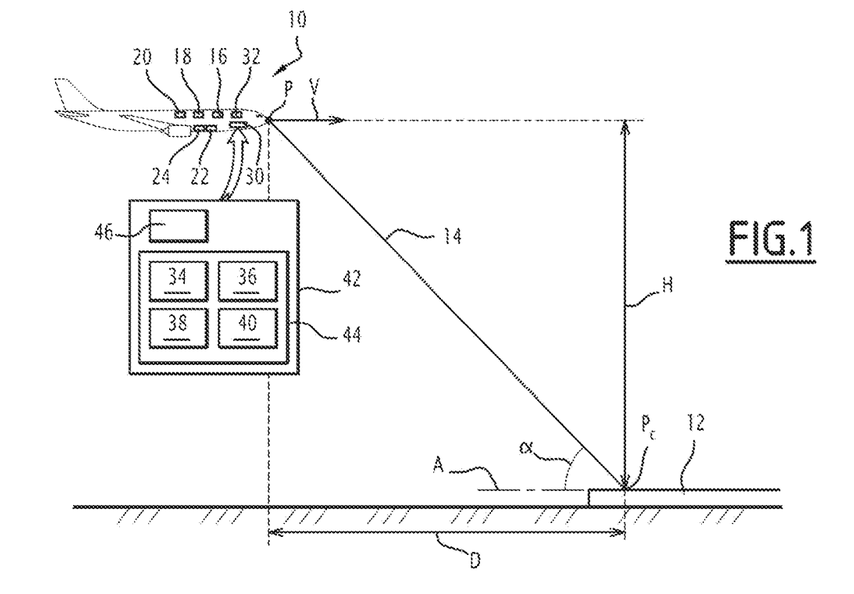
FIG. 1 shows a schematic representation of an aircraft during its approach to a runway, wherein the aircraft comprises several avionic systems and an electronic device for monitoring at least one radionavigation signal.

In FIG. 1, an aircraft 10 is in the approaching a runway 12, and is able to move along a predetermined approach axis 14 towards the runway 12.

The aircraft 10 is desirably an airplane. Alternatively, the aircraft 10 may be a helicopter, or remotely piloted a drone.

Relating to the terrestrial reference, the aircraft 10 has a current position P, also called instantaneous position, as well as a current speed V, also called instantaneous speed.

The aircraft 10 comprises all or part of the following systems to provide the parameters specific to the aircraft:

a system 16 for managing the flight of the aircraft, also called an FMS (Flight Management System), a satellite positioning system 18, also called a GNSS (Global Navigation Satellite System), such as a GPS (Global Positioning System);

an inertial reference system 20, also known as an IRS, which may be coupled or not to the GPS system;

an ILS 22 (Instrument Landing System)

an MLS 24 (Microwave Landing System);

a GLS 26 landing system (from GBAS Landing System where GBAS stands for Ground-Based Augmentation System);

a system for measuring the height of the aircraft with respect to the ground, such as an RADALT radio altimeter 27;

a radio positioning system 28, also called a VOR system (VHF Omnidirectional Range), operating with VHF frequencies; and a database 29 containing, in particular, data relating to the different runways of certain airports of one or more regions.

Persons skilled in the art will understand that the aircraft 10 comprises, in certain configurations, several of the aforementioned systems for redundancy reasons, as will be described in more detail with reference to FIGS. 8 and 9.

According to the described technology, the aircraft 10 also comprises an electronic device 30 for monitoring at least one radionavigation signal in the approach to the runway 12, wherein each radionavigation signal comes from a reception chain 32 on board the aircraft 10.

The runway 12 is substantially flat, and defines a reference horizontal plane A. The runway 12 comprises a characteristic point Pc, with reference to which the distance between the aircraft 10 and the runway 12 is, in particular, determined.

The predetermined approach centerline 14 has an angle $\alpha$ with respect to the reference plane A of the runway. The value of the angle $\alpha$ is, for example, equal to 3 degrees, and is, for example, stored in the database 29 containing information on the runways of the airports.

The different avionics systems, namely the FMS 16, GNSS 18, IRS 20, ILS 22, MLS 24, GLS 26 and VOR 28 systems, are known per se, and are capable of supplying various avionic parameters to the monitoring device 30.

The avionics parameters comprise:

the distance of the aircraft 10 to the runway threshold Pc, provided by the FMS 16 and/or GNSS 18 systems;

the instantaneous speed V of the aircraft 10, supplied by the GNSS 18 and/or IRS 20 systems, in particular the instantaneous ground speed, denoted GSpeed;

the instantaneous glide path FPA (Flight Path Angle) of the aircraft 10, also called the current glide path, and provided by the IRS 20 and/or GNSS 18 systems;

an instantaneous height H of the aircraft 10, also called the current height, above the runway and supplied by the RADALT 27 and/or FMS 16 and/or GNSS 18 systems;

an instantaneous course of the aircraft 10, also called the current course, and provided by the GNSS 18 and/or IRS 20 systems;

a current lateral angular deviation of the aircraft 10, or LOC (Localizer Deviation) signal, with respect to the predetermined approach centerline of the runway 12, provided by the ILS 22 and/or MLS 24 and/or GLS 26 systems; and a current vertical angular deviation of the aircraft 10, or GLIDE (Glide Deviation) signal with respect to the predetermined approach centerline of the runway 12, and provided by the ILS 22 and/or MLS 24 and/or GLS 26 systems.

Figure 2:
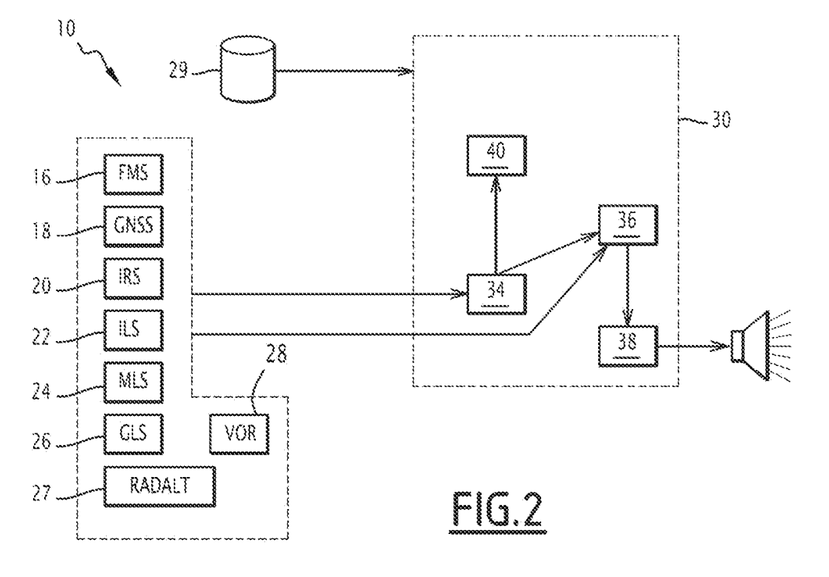
FIG. 2 shows a more detailed representation of the monitoring device of FIG. 1.

The electronic device 30 for monitoring at least one radionavigation signal comprises a calculation module 34 configured to calculate an angular displacement value in a reference plane, a first comparison module 36 configured to compare the calculated angular displacement value with the corresponding radionavigation signal, and a warning module 38 configured to generate a warning signal based on the result of the comparison between the calculated angular displacement value and the corresponding radionavigation signal.

Optionally in addition, the calculation module 34 is further configured to filter successive values of a monitored radionavigation signal.

According to this optional addition, the monitoring device 30 further comprises a second comparison module 40 configured to compare the mean value resulting from the filtering of the values of the monitored radionavigation signal, with a magnitude relating to the predicted course and the predicted glide slope with respect to the centerline of the runway according to the monitored radionavigation signal. The second comparison module 40 is also configured to compare the measured sensitivity of the measured variations with the predicted sensitivity according to the monitored radionavigation signal. The predicted magnitudes are provided from the database 29 on board the aircraft 10 and provide the theoretical values of the monitored magnitudes.

In the example of FIG. 1, the monitoring device 30 comprises an information processing unit 42 formed, for example, by a memory 44 associated with a processor 46.

The reception chain 32 comprises at least one of the above-mentioned landing aid systems, namely the ILS 22, the MLS 24 and the GLS 26 systems.

In the example of FIG. 1, the calculation module 34, the first comparison module 36, the warning module 38 and, in addition, the optional second comparison module 40, are each produced in the form of software executable by the processor 46. The memory 44 of the monitoring device 30 is then able to store calculation software configured to calculate an angular displacement value in the reference plane, first comparison software configured to compare the calculated angular displacement value with the corresponding radionavigation signal, and warning software configured to generate the warning signal according to the result of the comparison between the calculated angular displacement value and the corresponding radionavigation signal, as well as the optionally additional second comparison software configured to compare the mean value resulting from the filtering of the monitored radionavigation signal values, with a predicted magnitude relating to the predicted course and the predicted glide slope with respect to the runway according to the monitored radionavigation signal. The processor 46 of the information processing unit 42 is then able to execute the calculation software, the first comparison software, the warning software, as well as the optionally additional second comparison software.

In one variant (not shown), the calculation module 34, the first comparison module 36, the warning module 38 and, in addition, the optional second comparison module 40, are each in the form of a programmable logic component such as an FPGA (Field Programmable Gate Array), or in the form of a dedicated integrated circuit, such as an ASIC (Application Specific Integrated Circuit).

According to the described technology, the calculation module 34 is configured to calculate the angular displacement value as a function of a magnitude relating to the aircraft course and glide slope according to the monitored radionavigation signal, wherein the magnitude relating to the aircraft is obtained from avionics equipment independently of the reception chain 32, such from the GNSS 18 or IRS 20 systems.

The calculation module 34 is then configured to calculate the angular displacement value independently of position information from a ground beacon capable of transmitting the radionavigation signal, such as an LOC beacon capable of transmitting an LOC signal, or a GLIDE beacon capable of transmitting a GLIDE signal.

Figure 3:
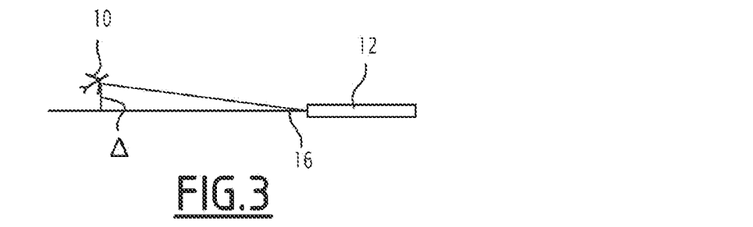
FIG. 3 shows a schematic representation of a lateral displacement of the aircraft in a horizontal plane.

When the monitored radionavigation signal is an LOC signal, the calculation module 34 is configured to calculate, as a function of the instantaneous course of the aircraft 10, a lateral angular displacement $\Delta$, also called the lateral angular displacement value, on either side of a mean direction of approach to the runway in a horizontal plane, wherein the mean direction is also calculated by the calculation module 34 as shown in FIG. 3.

Figure 4:
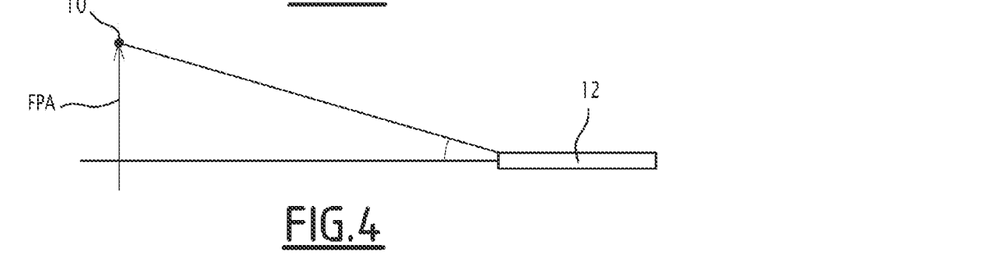
FIG. 4 shows a schematic representation of a vertical displacement of the aircraft in a vertical plane.

When the monitored radionavigation signal is a GLIDE signal, the calculation module 34 is configured to calculate, as a function of the instantaneous glide path FPA of the aircraft 10, a vertical angular displacement value on either side of a mean glide path to the runway in a vertical plane, wherein the average glide path is also calculated by the calculation module 34, as shown in FIG. 4.

In addition, the calculated angular displacement value is desirably expressed in DDM, while the calculation module 34 is configured to calculate a linear deviation from a magnitude dependent on the monitored radionavigation signal and the magnitude relating to the aircraft course and glide slope, and then the linear deviation is converted into the angular displacement value expressed in DDM. The magnitude dependent on the monitored radionavigation signal is, for example, a mean value resulting from the filtering of the values of the monitored radionavigation signal.

According to this addition, the calculation module 34 is, for example, configured to calculate the linear deviation also as a function of an integration of the predicted instantaneous speed V of the aircraft 10 in the mean approach direction or the mean glide path in the corresponding reference plane.

Figure 5:
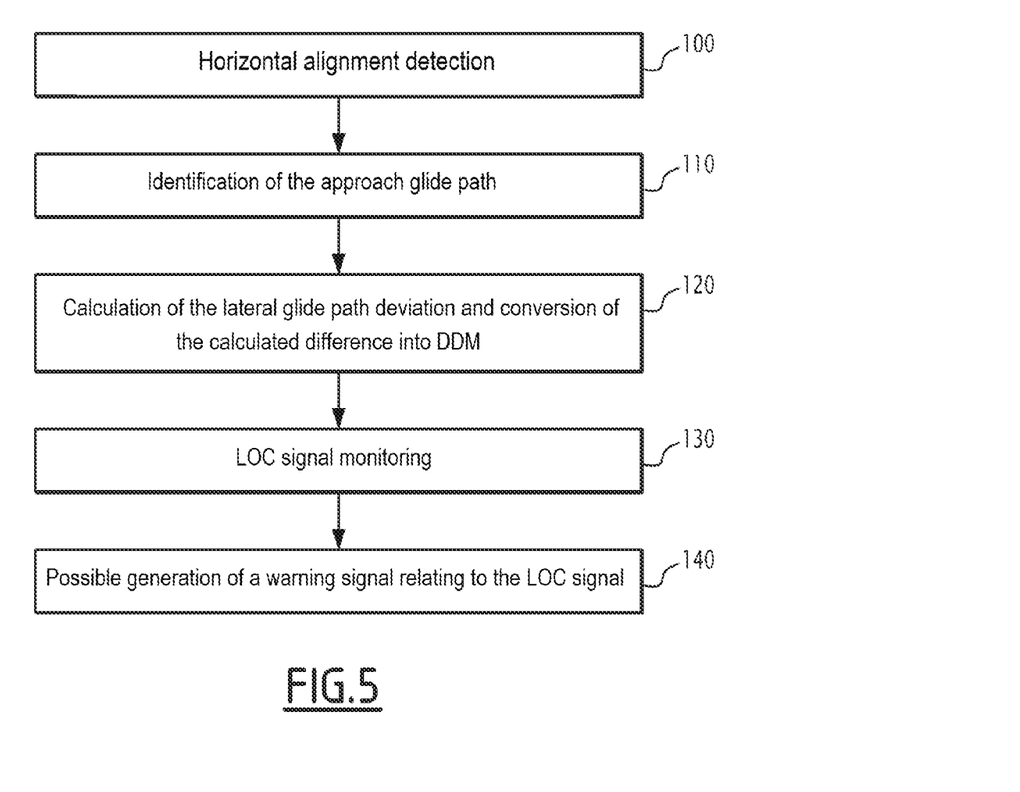
FIG. 5 shows a flowchart of a monitoring method according to the described technology, when calculating a lateral angular displacement value in the horizontal plane.
Figure 6:
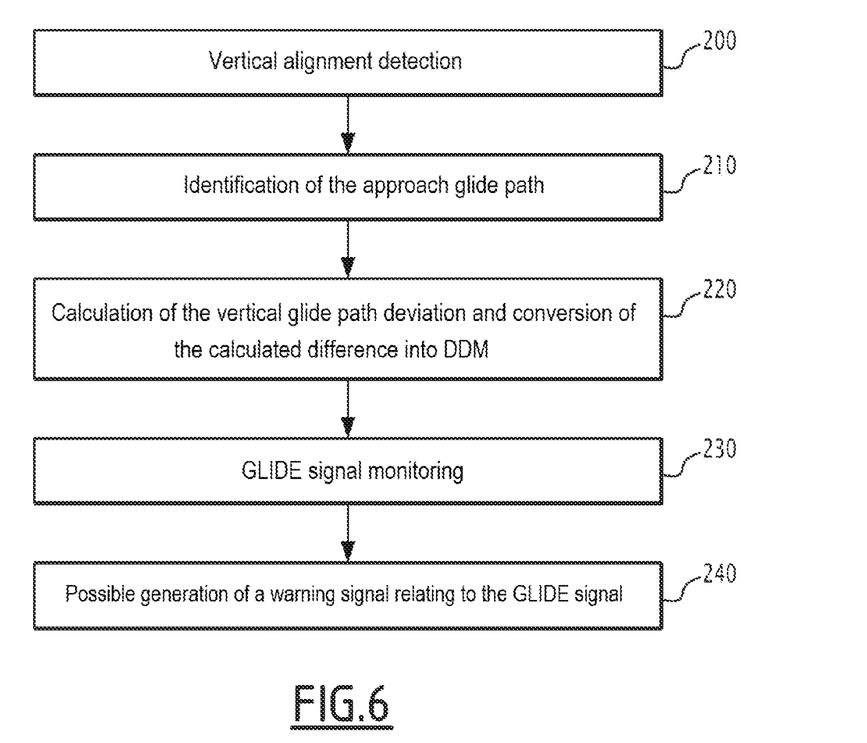
FIG. 6 shows a view similar to that of FIG. 5 when calculating a vertical angular displacement value in the vertical plane.

The operation of the electronic monitoring device 30, and, in particular, of the calculation module 34, will now be described in more detail with reference to FIGS. 5 and 6 which show a flowchart of the monitoring method according to the described technology when monitoring the LOC signal with calculation of the lateral angular displacement value in the horizontal plane (FIG. 5), and, respectively, a flowchart of the monitoring method according to the described technology when monitoring the GLIDE signal with calculation of the vertical angular displacement value in the vertical plane (FIG. 6).

When the monitoring the LOC signal during an initial step 100, the calculation module 34 first detects whether the aircraft 10 is aligned or not with respect to the centerline of the runway 12 in the corresponding reference plane, i.e. in the horizontal plane for the LOC signal.

To perform this detection of a horizontal alignment of the aircraft 10, i.e. an alignment of the aircraft 10 in the horizontal plane, the calculation module 34 checks, for example, that the values successively received from the LOC signal do not vary beyond a predefined threshold for a predefined time. By way of example, the calculation module 34 checks that the variations are less than 0.01 DDM for the values successively received from the LOC signal for a period of at least 10 seconds.

When the variations of the received LOC signal do not exceed the predefined threshold for the predefined duration, the calculation module 34 concludes that a horizontal alignment of the aircraft 10 has been detected, and proceeds to the next step 110.

In the contrary case, the calculation module 34 determines that the aircraft 10 is not aligned in the horizontal plane, and thus does not proceed to the next step 110. The calculation module 34 then remains in this initial step 100 until a horizontal alignment is detected.

In the next step 110, the calculation module 34 performs a filtering of the successive values of the signal allowing monitoring of the radio-navigation signal in question, in this case the LOC signal, in order to identify the direction of approach of the aircraft 10. In other words, the calculation module 34 then determines through filtering the direction of the LOC signal from the instantaneous course of the aircraft 10, provided, for example, by the GNSS 18 or IRS 20 systems.

The filtering performed by the calculation module 34 is, for example, low-pass filtering with a time constant greater than or equal to 30 seconds.

The filtering performed is, for example, implemented via a sliding average on the successively received values of the current course from the moment when the LOC signal is stabilized. The filtering implemented by the calculation module 34 then checks, for example, the following equations:

$$\text{TrackRWY}_N = ((N-1)\text{TrackRWY}_N + \text{Track}(T))/N \quad (1)$$

$$\text{TrackRWY}(T) = \text{TrackRWY}_N \quad (2)$$

where N is an integer index whose value is incremented by one unit at each new value of the LOC signal;

TrackRWY$_N$ represents the index value N of the mean course provided by the IRS and/or GNSS systems, defining the mean direction of approach towards the course that is assumed to be, for example, the runway centerline 12;

Track(T) represents the instantaneous course of the aircraft 10 at the instant T; and TrackRWY(T) represents the thus filtered value of the LOC signal at time T.

Optionally in addition, the filtering step 110 to determine whether the direction of approach of the aircraft 10 implemented as the instantaneous altitude H of the aircraft 10, provided for example by the GNSS 18 or IRS 20 systems, is greater than a predefined threshold value, wherein this threshold value is, for example, less than or equal to 300 ft.

The calculation module 34 then calculates, during a step 120, an angular displacement value in the corresponding reference plane, in this case an angular course deviation in the horizontal plane.

The angular course deviation is desirably expressed in DDM, wherein the calculation module 34 then calculates a linear course deviation from a magnitude dependent on the monitored radionavigation signal and the course, and then converts the linear course deviation into the angular course deviation expressed in DDM. In the example described, the magnitude dependent on the monitored radionavigation signal is the mean value resulting from the filtering of the values of the current course, carried out during the preceding step 120.

Optionally in addition, the deviation calculation step 120 is implemented from the moment when the instantaneous altitude H of the aircraft 10, supplied for example by the GNSS 18 or IRS 20 systems, is less than a predefined threshold value, wherein this threshold value desirably has the same value as the aforementioned altitude threshold value, and is for example less than or equal to 300 ft.

For calculating the linear course deviation, the calculation module 34 calculates, for example, the lateral displacement of the aircraft 10 on the horizontal centerline with respect to the centerline of the runway 12 by integration of the predicted lateral ground speed of the aircraft 10 with the course deviation, from the moment when the approach direction of the runway 12 by the aircraft 10 has been identified in the previous step.

The calculation of the lateral displacement of the aircraft 10 effected by the calculation module 34, then checks, for example, the following equation:

$$\text{Ecart\_track}(T) = \text{Track}(T) - \text{TrackRWY}(T) \quad (3)$$

where Track(T) represents the instantaneous course of the aircraft 10 at time T;

TrackRWY(T) represents the filtered value of the LOC signal at time T, obtained during the previous step 110; and Ecart_track(T) represents the lateral deviation of the aircraft 10 at time T.

The integration of the ground speed of the aircraft 10 projected laterally with the course deviation in the horizontal plane then satisfies, for example, the following equations:

$$\text{Depl\_Lat}(T) = G\text{Speed}(T)*\sin(E\text{cart\_track}(T))*\text{Tech} \quad (4)$$

$$\text{Cumul\_depl\_lat}(T) = \text{Cumul\_depl\_lat}(T) + \text{Dep\_Lat}(T) \quad (5)$$

where GSpeed(T) represents the instantaneous ground speed of the aircraft 10, provided for example by the GNSS 18 or IRS 20 systems;

Ecart_track(T) represents the lateral deviation of the aircraft 10 calculated using equation (3);

Tech represents a sampling period; and

Cumul_depl_lat (T) represents the lateral displacement of the aircraft 10, thus calculated by integration of the ground speed of the aircraft 10.

In step 120, the lateral displacement of the aircraft 10, or the calculated linear lateral course deviation, is then converted by the calculation module 34 into an angular course deviation expressed in DDM.

This angular conversion of the lateral displacement of the aircraft 10 into horizontal DDM is, for example, carried out on the basis of a measurement of the distance of the aircraft at the threshold of the runway 12, increased by simulated position value(s) of an LOC beacon, and a reference value of a scale factor making it possible to go from an angular value to a DDM value for an LOC signal deviation, wherein this reference value is, for example, stored in the database 29.

The angular conversion of the lateral displacement of the aircraft 10 into horizontal DDM then verifies for example the following equations:

$$\text{LOC\_IRS\_Deg}(T) = A\tan(\text{Cumul\_depl\_lat}(T)/(\text{Dist}(T)+\text{LocDist})) \quad (6)$$

$$\text{LocAmp} = A\tan(TH\text{Loc}/2/\text{LocDist}) \quad (7)$$

$$\text{LOC\_IRS\_ddm}(T) = \text{LOC\_IRS\_Deg}(T)*0.155/\text{LocAmp} \quad (8)$$

where Cumul_depl_lat(T) represents the lateral displacement of the aircraft 10, previously calculated using equation (5);

Dist (T) represents the distance of the aircraft at the threshold of the runway 12;

LocDist represents a simulated position value of an LOC beacon, wherein this predefined value is, for example, stored in the database 29;

LOC_IRS_Deg(T) represents the angular course deviation at time T;

LocAmp is a scaling factor to change from an angular value into a DDM value for an LOC deviation signal; and LOC_IRS_ddm(T) represents the angular course deviation expressed in DDM at time T.

In the next step 130, the comparison module 36 then compares the angular displacement value calculated by the calculation module 34, such as the angular course deviation expressed in DDM LOC_IRS_ddm(T), with the corresponding radionavigation signal, such as the LOC signal expressed in DDM at time T, denoted LOC(T), coming from the reception chain 32. This then makes it possible to detect any measurement error of the LOC signal in the reception chain 32.

The warning module 38 then generates during step 140, a warning signal according to the result of the comparison between the calculated angular displacement value LOC_IRS_ddm(T) and the corresponding radionavigation signal LOC(T), which was performed in the previous step 130 by the comparison module 36. More specifically, the warning module 38 generates a warning signal when a measurement error is detected in the reception chain 32.

The warning signal is, for example, generated from the moment when the absolute value of the difference between the calculated angular displacement value LOC_IRS_ddm(T) and the corresponding radio navigation signal LOC (T) is greater than a predefined threshold. during at least one predefined minimum period, wherein this predefined minimum period is, for example, substantially equal to two seconds.

Optionally in addition, the second comparison module 40 compares the average value resulting from the filtering of the values of the current course carried out in step 110, with a predicted course towards the centerline of the runway 12. This then also allows the detection of a possible calibration anomaly of the LOC signal emitted by the LOC beacon positioned on the ground near the runway 12. The predicted course to the centerline of the runway 12 is, for example, stored in the database 29 on board the aircraft 10.

Also optionally in addition, the second comparison module 40 compares the difference in sensitivity resulting from the observation of the deviation between the LOC(T) and LOC_IRS_ddm(T) signals calculated during the step 120. This then makes it possible to detect, in addition, a possible sensitivity anomaly of the LOC signal emitted by the beacon LOC located on the ground close to the runway 12.

In the case of monitoring the GLIDE signal as shown in the flowchart of FIG. 6 during an initial step 200, the calculation module 34 first detects whether the aircraft 10 is aligned or not with respect to the centerline of the runway 12 in the corresponding reference plane, i.e. in the vertical plane in the case of the GLIDE signal.

To perform this detection of a vertical alignment of the aircraft 10, i.e. an alignment of the aircraft 10 in the vertical plane, the calculation module 34 determines, for example, whether the values of the GLIDE signal successively received do not vary beyond a predefined threshold for a predefined time. By way of example, the calculation module 34 verifies that the variations are less than 0.01 DDM in the successively received values of the GLIDE signal for a period greater than or equal to 20 seconds.

When the variations of the GLIDE signal received do not exceed the predefined threshold for the predefined duration, the calculation module 34 concludes that it has detected vertical alignment of the aircraft 10, and proceeds to the next step 210.

In the contrary case, the calculation module 34 determines that the aircraft 10 is not aligned in the vertical plane and does not proceed to the next step 210. The calculation module 34 then remains in this initial step 200 until vertical alignment is detected.

In the next step 210, the calculation module 34 performs a filtering of the successive values of the monitoring signal of the radionavigation signal in question, in this case the GLIDE signal, in order to identify the approach glide path of the aircraft 10. In other words, the calculation module 34 then identifies by filtering the glide path of the GLIDE signal from the instantaneous glide path FPA(T) of the aircraft 10, provided, for example, by the GNSS 18 or IRS 20 systems.

The filtering performed by the calculation module 34 is, for example, low-pass filtering with a time constant substantially equal to 30 seconds.

The filtering performed is, for example, implemented via a sliding average on the successively received values of the current glide path from the moment the GLIDE signal is stabilized. The filtering effected by the calculation module 34 then checks, for example, the following equations:

$$FPARWY_N = ((N-1)FPARWY_N + FPA(T))/N \tag{9}$$

$$FPARWY(T) = FPARWY_N \tag{10}$$

where N is an integer index whose value is incremented by one unit at each new value of the GLIDE signal;

$FPARWY_N$ represents the index value N of the average slope signal;

FPA(T) represents the instantaneous slope of the aircraft 10 at time T; and

FPARWY(T) represents the thus filtered value of the average slope signal at time T.

Optionally in addition, the filtering step 210 to determine whether the approach glide path of the aircraft 10 provided as the instantaneous altitude H of the aircraft 10, for example, by the GNSS 18 or RADALT 27 systems, is greater than a predefined threshold value, wherein this threshold value is, for example, less than or equal to 300 ft.

The calculation module 34 then calculates, during a step 220, an angular displacement value relating to the average glide path in the corresponding reference plane, in this case an angular glide path deviation in the vertical plane.

The angular glide path deviation is desirably expressed in DDM, and the calculation module 34 then calculates a linear glide path deviation from a magnitude dependent on the monitored radionavigation signal and the current glide path, and then converts the linear glide path deviation into the angular glide path deviation expressed in DDM. In the example described, the magnitude dependent on the monitored radionavigation signal is the mean value resulting from the filtering of the values of the current glide path signal, carried out during the preceding step 220.

Optionally in addition, the deviation calculation step 220 is implemented from the moment when the instantaneous altitude H of the aircraft 10, supplied, for example, by the GNSS 18 or IRS 20 systems, is less than a predefined threshold value, wherein this threshold value desirably has the same value as the aforementioned altitude threshold value, and is, for example, less than or equal to 300 ft.

To calculate the linear glide path difference, the calculation module 34 calculates, for example, the vertical displacement of the aircraft 10 on the vertical axis and transverse to the glide path towards the runway 12, by integration of the predicted ground speed of the aircraft 10 vertically with the glide path deviation, from the moment the approach glide path of the aircraft 10 towards the runway 12 is identified in the previous step.

The calculation of the vertical displacement of the aircraft 10, effected by the calculation module 34, then checks, for example, the following equation:

$$\text{Ecart\_FPA}(T) = \text{FPA}(T) - \text{FPARWY}(T) \tag{11}$$

where FPA(T) represents the instantaneous glide path of the aircraft 10 at time T;

FPARWY(T) represents the filtered value of the GLIDE signal at time T, obtained in the previous step 210; and Ecart_FPA(T) represents a vertical deviation of the aircraft 10 at time T.

The integration of the ground speed of the aircraft 10 predicted vertically with the glide path deviation in the vertical plane then satisfies, for example, the following equations:

$$\text{Depl\_Vert}(T) = G\text{Speed}(T)*\sin(\text{FPA}(T))*\sin(\text{Ecart\_FPA}(T))*\text{Tech} \tag{12}$$

$$\text{Cumul\_depl\_vert}(T) = \text{Cumul\_depl\_vert}(T) + \text{Dep\_vert}(T) \tag{13}$$

where GSpeed(T) represents the instantaneous ground speed of the aircraft 10, provided for example by the GNSS 18 or IRS 20 systems;

FPA_Earge(T) represents the vertical deviation of the aircraft 10 calculated using equation (11);

Tech represents a sampling period; and

Cumul_depl_vert(T) represents the vertical displacement of the aircraft 10 calculated by integration of the ground speed of the aircraft 10.

During step 220, the vertical displacement of the aircraft 10 or the linear deviation of the calculated vertical glide path, is then converted by the calculation module 34, into an angular glide path deviation expressed in DDM.

This angular conversion of the vertical displacement of the aircraft 10 into vertical DDM is, for example, made from a measurement of the distance of the aircraft from the threshold of the runway 12, increased by simulated position value(s) from a GLIDE beacon, and a reference value of a scale factor for changing from an angular value to a DDM value for a GLIDE signal deviation, wherein this reference value is, for example, stored in the database 29.

The angular conversion of the vertical displacement of the aircraft 10 into vertical DDM then verifies, for example, the following equations:

$$\text{GS\_IRS\_Deg}(T) = A\,\tan(\text{Cumul\_depl\_vert}(T)/(\text{Dist}(T)+\text{GSDist})) \tag{14}$$

$$\text{GSAmp} = 0.75*\text{FPAREF} \tag{15}$$

$$\text{GS\_IRS\_ddm}(T) = \text{GS\_IRS\_Deg}(T)*0.175/\text{GSAmp} \tag{16}$$

where Cumul_depl_vert(T) represents the vertical displacement of the aircraft 10, previously calculated using equation (5);

Dist(T) represents the distance of the aircraft from the threshold of the runway 12;

GSDist represents a simulated position value of a GLIDE beacon, wherein this predefined value is, for example, stored in the database 29;

GS_IRS_Deg(T) represents the angular glide path deviation at time T;

GSAmp is a scaling factor to change from an angular value to a DDM value for a GLIDE signal deviation; and GS_IRS_ddm(T) represents the angular glide path deviation expressed in DDM at time T.

In the next step 230, the comparison module 36 then compares the angular displacement value calculated by the calculation module 34, such as the glide path angular deviation expressed in DDM GS_IRS_ddm(T), with the corresponding radionavigation signal, such as the GLIDE signal expressed in DDM at the time T, denoted GS(T), coming from the reception chain 32, in order to detect a possible measurement error of the GLIDE signal in the reception chain 32.

The warning module 38 then generates, during step 240, a warning signal as a function of the result of the comparison between the calculated angular displacement value GS_IRS_ddm(T) and the corresponding radionavigation signal GS(T), wherein this comparison was made in the previous step 230 by the comparison module 36. More specifically, the warning module 38 generates a warning signal when a measurement error is detected in the reception chain 32.

The warning signal is, for example, generated from the moment when the absolute value of the deviation between the calculated angular displacement value GS_IRS_ddm(T) and the corresponding radionavigation signal GS(T) is greater than a predefined threshold. during at least one predefined minimum period, wherein this minimum predefined period is, for example, substantially equal to two seconds.

Optionally in addition, the second comparison module 40 compares the average value resulting from the filtering of the values of the GLIDE signal, carried out during step 210, with a predicted glide path towards the centerline of the runway 12. This then allows the further detection of a possible GLIDE signal calibration anomaly emitted by the GLIDE beacon located on the ground near the runway 12. The predicted glide path towards the centerline of the runway 12 is, for example, stored in the database 29 on board the aircraft 10.

Optionally in addition also, the second comparison module 40 compares the difference in sensitivity resulting from the observation of the deviation between the GLIDE(T) and GLIDE_IRS_ddm(T) signals calculated during the step 120. This then makes it possible to further detect a possible sensitivity anomaly of the GLIDE signal, emitted by the GLIDE beacon positioned on the ground near the runway 12.

The monitoring device 30 according to the described technology thus takes advantage of the fact that the final approach to the runway 12 by the aircraft 10 is carried out at a roughly constant speed of the aircraft 10. Under these conditions, the measurement errors provided by an IRS inertial navigation system or GNSS satellite positioning system remain approximately constant during the limited time of the approach.

During this approach phase, the IRS inertial navigation system or GNSS satellite positioning system then makes it possible to observe precisely the direction and the glide path followed by the aircraft 10, possibly closely.

The monitoring device 30 according to the described technology then uses the variations around the mean direction followed by the aircraft 10, and, respectively, the variations around the mean glide path, in order to monitor the corresponding radio navigation signal received, namely the LOC signal, and, respectively, the GLIDE signal, and to detect possible measurement errors on the simple chains that provide the horizontal and LOC vertical GLIDE radionavigation signals.

Optionally in addition, when the second comparison module 40 compares the direction observations and the mean glide path, as well as the movements about the observed values, with the theoretical values predicted for an approach guided by the ILS, MLS or GLS system in question, towards a given runway 12, the monitoring device 30 according to the described technology makes it further possible to verify that the input signal of the monitoring device 30 according to the described technology is in accordance with the corresponding predicted signal, i.e. indicating what it should be. The monitoring device 30 then makes it possible to use an ILS, MLS and/or GLS guidance signal under more stringent conditions than those for which it is qualified, in particular to authorize the descent of the aircraft 10 to a lower minima when used in combination with SVGS (Synthesis Vision Guidance System) systems.

In addition, the monitoring device 30 according to the described technology makes it possible to monitor the radionavigation signals received during the approach phase to the runway, such as the LOC and/or GLIDE signals received, and to detect a measurement error in a corresponding reception chain, if necessary, and to reduce the equipment redundancies required in the architectures allowing the implementation of the most restrictive approach and landing operations.

The monitoring device 30 according to the described technology then also makes it possible to reduce the need for redundancy to two simple ILS, MLS or GLS 32 chains in order to support the requirements related to an ability to continue to operate with a sufficient level of integrity after detection of a fault on one of the redundant chains. In the event of failure of one of the two simple ILS, MLS or GLS 32 chains, the corresponding monitoring device 30 then makes it possible to identify the defective ILS, MLS or GLS 32 chain, and to ensure the monitoring of the ILS, MLS or GLS 32 chain remaining operational. The monitoring device (s) 30 according to the described technology then make it possible to consolidate the ILS, MLS and/or GLS parameters that may be implemented in various components of the architecture.

Figure 7:
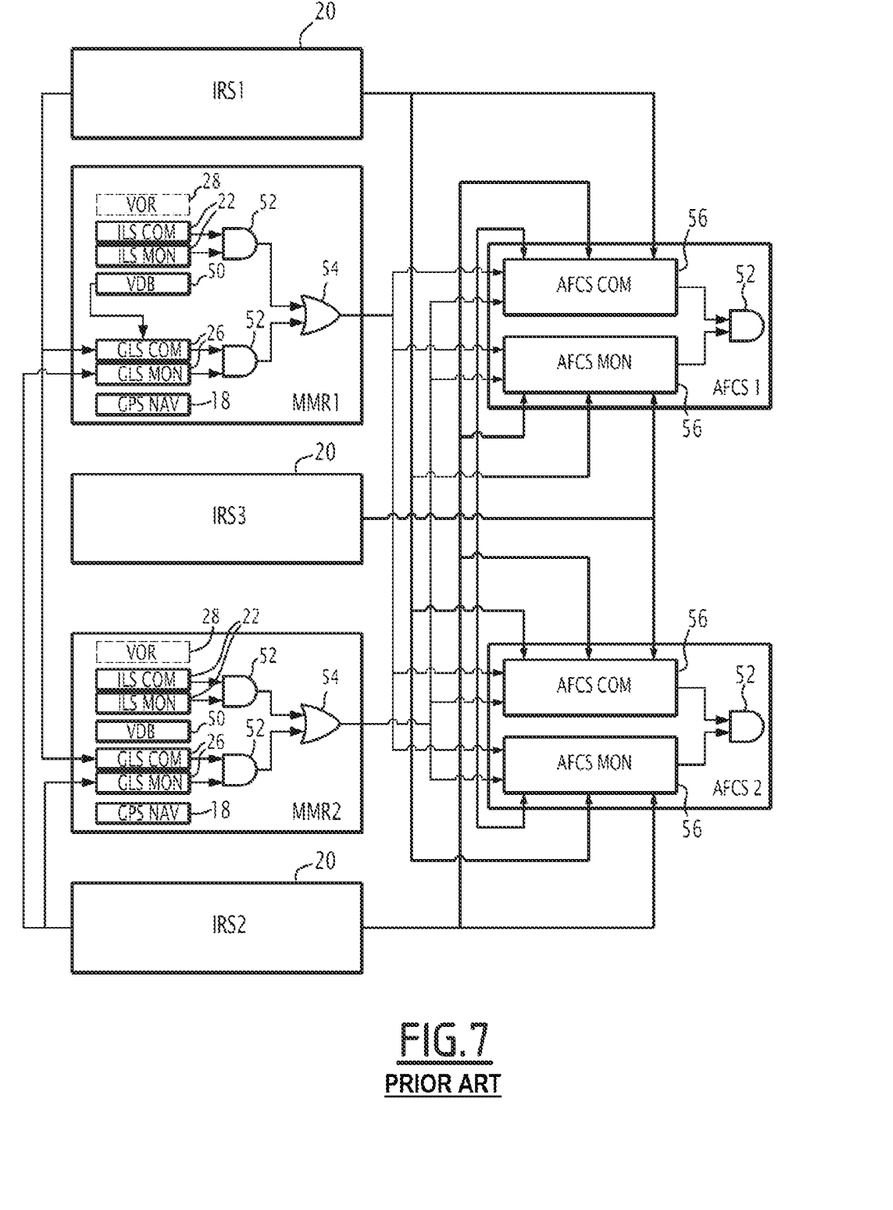
FIG. 7 shows a schematic representation of a prior art redundant architecture comprising several avionic systems.
Figure 8:
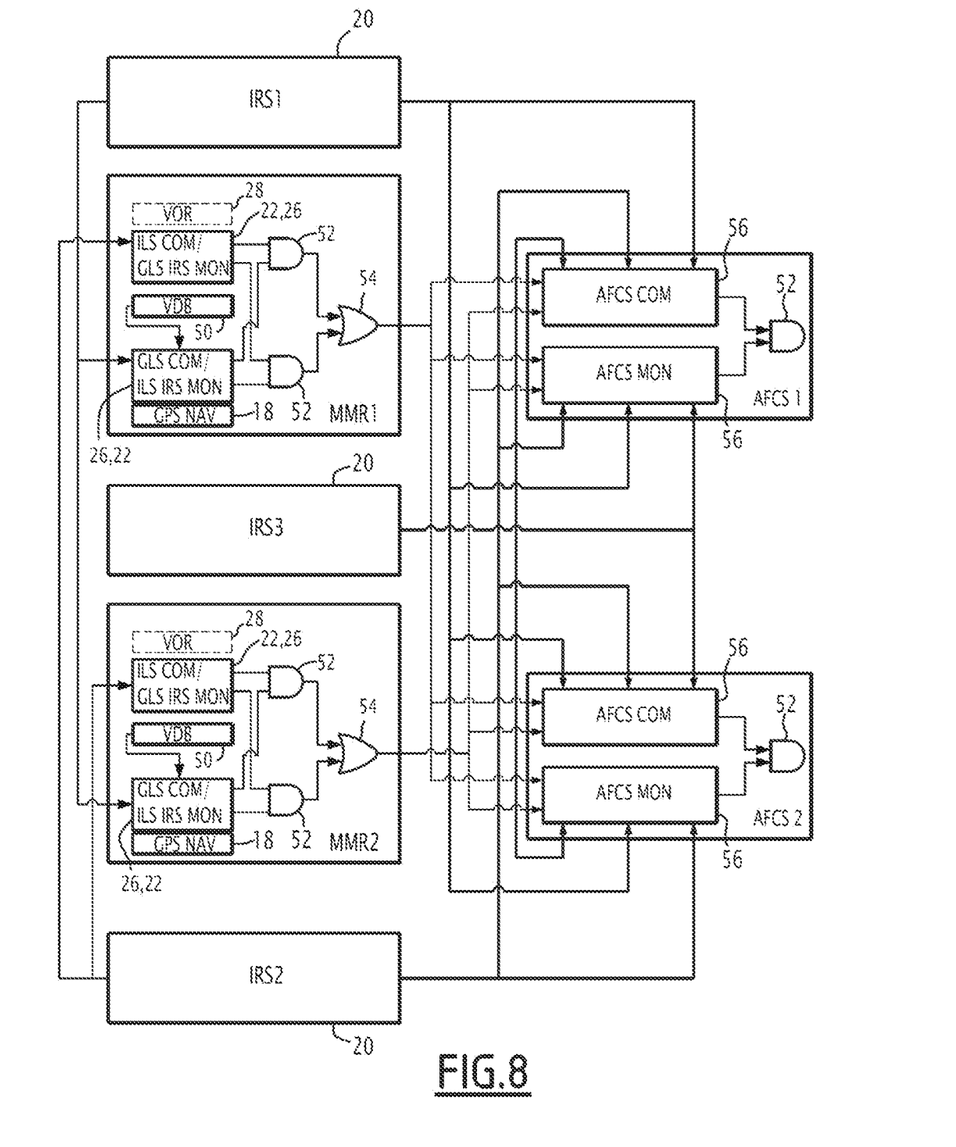
FIG. 8 shows a schematic representation of a redundant architecture according to the described technology, comprising several avionic systems and the monitoring device of FIG. 1 according to a first configuration.
Figure 9:
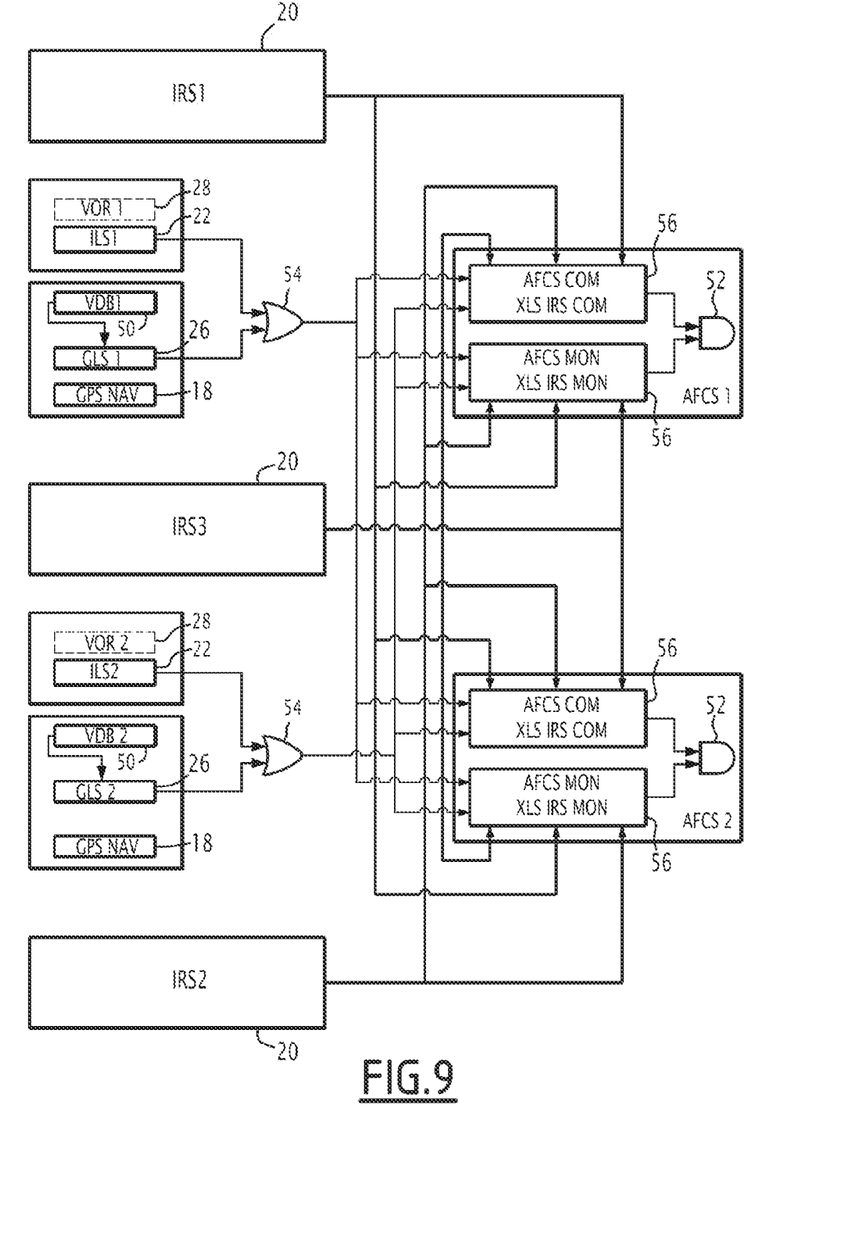
FIG. 9 shows a view similar to that of FIG. 8, according to a second configuration.

The electronic device 30 for monitoring at least one radionavigation signal during the approach phase thus makes it possible to simplify the equipment complexity of the architecture solutions that are implemented to satisfy the integrity and continuity requirements required for landings in conditions of the most restrictive visibility, as will be explained below with reference to FIGS. 7 to 9, wherein FIG. 7 shows a schematic representation of a redundant architecture of the prior art, while FIGS. 8 and 9 show schematic representations of redundant architectures according to the described technology, respectively according to a first configuration and a second configuration.

In order to guarantee the level of integrity and continuity required to support the landing and taxiing operations in the most restricted visibility conditions, so-called Category IIIB conditions, a simple guiding equipment chain is not sufficient, and it is then necessary to have redundancy of some avionics systems. The requirement in the system design to support landing and taxiing is the ability to continue to operate with a sufficient level of integrity after detecting a failure on one of the redundant chains, wherein these systems are then referred to as the FAIL-OPERATIONAL type.

An aircraft 10 allowed landing in Category IIIB conditions then generally implements a COMMON dual type hardware architecture through pairs of multi-mode receiving equipment, also called MMR (Multi-Mode Receiver), whose internal architecture is redundant, for the supply of ILS, MLS and/or GLS guidance information.

FIG. 7 shows a prior art avionics architecture using MMR assemblies to support approach and landing operations in Category IIIB conditions.

This figure shows mainly the MMR assemblies, but also the IRS and AFCS 56 (Aircraft Flight Control System) systems that are required in the construction of an autopilot system of the FAIL-OPERATIONAL type, that is required to support the approach and landing operations in very low visibility conditions (Category IIIB).

The architecture is dual COMMON in the MMR assembly for the provision of LOC and GLIDE deviations in ILS or GLS, and in the AFCS 56 autopilot system for the calculation of control surface commands and engine commands, with the use of AND 52 logic gates, and then an OR 54 logic gate. The architecture is triplex for the provision of inertial information used by the AFCS 56 autopilot system for the stabilization of the aircraft 10. The MMR assembly also comprises a VDB system 50 for the transmission of VHF data.

Persons skilled in the art will note that the function of the MMR assembly is not limited to providing the ILS or GLS information during the approach phase to the runway 12. In fact, the provision of the ILS information requires the implementation of VHF type radio reception modules, while, when not in ILS mode, these VHF type radio reception modules may be used to provide VOR measurements for conventional navigation, or datalink data used by the VHF radio receiver module; the GLS 26 system. The provision of GLS information requires the implementation of GNSS system(s) 18.

FIG. 8 shows an avionic architecture according to the described technology, according to a first configuration with a simplified MMR assembly. Instead of duplicating the processing chains ILS and GPS in the MMR assembly, the monitoring device 30 according to the described technology is simply duplicated on each of the simple ILS and GLS chains, for example in the form of a monitoring algorithm executed by an information processing unit 42 of an existing electronic device, or in the form of a dedicated electronic device. The monitoring device 30 associated with the simple ILS chain maintains the monitoring of the simple GLS chain in the GLS approach mode based on inertial input data of course, glide path and distance to the threshold of the runway. Conversely, the monitoring device 30 associated with the simple GLS chain maintains the monitoring of the simple ILS chain in ILS approach mode based on inertial input data of course, glide path and distance to the threshold of the runway. Compared to an MMR assembly of the prior art which comprises a double ILS chain and a double GLS chain, the advantage is two computers in the simplified MMR assembly according to the described technology. The associated benefits are then a simplification of the design and a significant reduction of the cost with equivalent functionality. It is also possible to use the simplified MMR assembly within avionic architectures intended for aircraft that do not need FAIL-OPERATIONAL type capacity.

FIG. 9 shows an avionic architecture according to the described technology, according to a second configuration, using separate single ILS and GPS chains, providing ILS and GLS guidance deviations, to which the FAIL-OPERATIONAL type capability is added by implementing monitoring devices 30 according to the described technology, in order to monitor the received ILS or GLS signals, in particular for the various AFCS 56 autopilot systems, which must necessarily provide a FAIL-OPERATIONAL capability. The associated advantage is then to offer an alternative architecture to the MMR assembly, by reusing GPS 18 or ILS 22 systems that are also used in aircraft architectures that do not aim for FAIL-OPERATIONAL capability.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An electronic device for monitoring at least one radionavigation signal of an aircraft in the approach phase of a runway, each radionavigation signal being obtained from a reception chain on board the aircraft, the device being on board the aircraft and comprising:
   a processor; and
   a memory having stored thereon instructions that, when executed by the processor, cause the processor to:
      calculate an angular displacement value in a reference plane;
      compare the calculated angular displacement value with the corresponding radionavigation signal; and
      generate a warning signal as a function of the result of the comparison between the calculated angular displacement value and the corresponding radionavigation signal,
   wherein the instructions further cause the processor to calculate the angular displacement value as a function of a magnitude relating to the aircraft among a course and a glide path, according to the monitored radionavigation signal, and
   wherein the magnitude relating to the aircraft originates from avionic equipment on board the aircraft independently of the reception chain.

2. The device of claim 1, wherein the instructions further cause the processor to calculate the angular displacement value independently of position information of a ground beacon capable of transmitting the radio navigation signal.

3. The device of claim 1, wherein the monitored radionavigation signal comprises a localizer deviation (LOC) signal, wherein the instructions further cause the processor to calculate a lateral angular displacement value in a horizontal plane according to the course of the aircraft.

4. The device of claim 1, wherein the monitored radionavigation signal comprises a glide deviation (GLIDE) signal, and the instructions further cause the processor to— calculate a vertical angular displacement value in a vertical plane according to a glide path of the aircraft.

5. The device of claim 1, wherein the angular displacement value is expressed in difference in depth of modulation (DDM), and the instructions further cause the processor to calculate a linear deviation based on a magnitude as a function of the monitored radionavigation signal and a magnitude relating to the aircraft course and glide path, then to convert the linear deviation into the angular displacement value expressed in DDM.

6. The device of claim 5, wherein the instructions further cause the processor to perform a filtering of successive values of the monitored radionavigation signal, while the magnitude dependent on the monitored radionavigation signal comprises a mean value resulting from the filtering of the values of the monitored radionavigation signal.

7. The device of claim 6, wherein the instructions further cause the processor to compare the mean value resulting from the filtering of the values of the monitored radionavigation signal, with a predicted magnitude relating to the predicted course and the predicted glide slope towards the centerline of the runway according to the monitored radionavigation signal, wherein the predicted magnitude is obtained from a database on board the aircraft and provides the theoretical values of the monitored magnitudes.

8. The device of claim 5, wherein the instructions further cause the processor to calculate the linear deviation as a further function of an integration of the predicted speed of the aircraft in the reference plane.

9. A method of monitoring at least one radionavigation signal of an aircraft in the approach to a runway, each radionavigation signal being derived from a reception chain on board the aircraft, the method being effected by a processor of an electronic monitoring device on board the aircraft, and comprising:
   calculating an angular displacement value in a reference plane;
   comparing the calculated angular displacement value with the corresponding radionavigation signal; and
   generating a warning signal as a function of the result of the comparison between the calculated angular displacement value and the corresponding radionavigation signal,
   wherein that the calculation of the angular displacement value is performed as a function of a magnitude relating to the aircraft among a course and a glide path, according to the monitored radionavigation signal, wherein the magnitude relating to the aircraft is obtained from avionic equipment independently of the reception chain.

10. A non-transitory computer-readable storage medium having stored thereon software instructions which, when executed by a computer, implement the method of claim 9.

* * * * *